March 25, 1924.
L. E. VARING
1,488,415
DRAFT EQUALIZER
Filed July 31, 1922
3 Sheets-Sheet 2
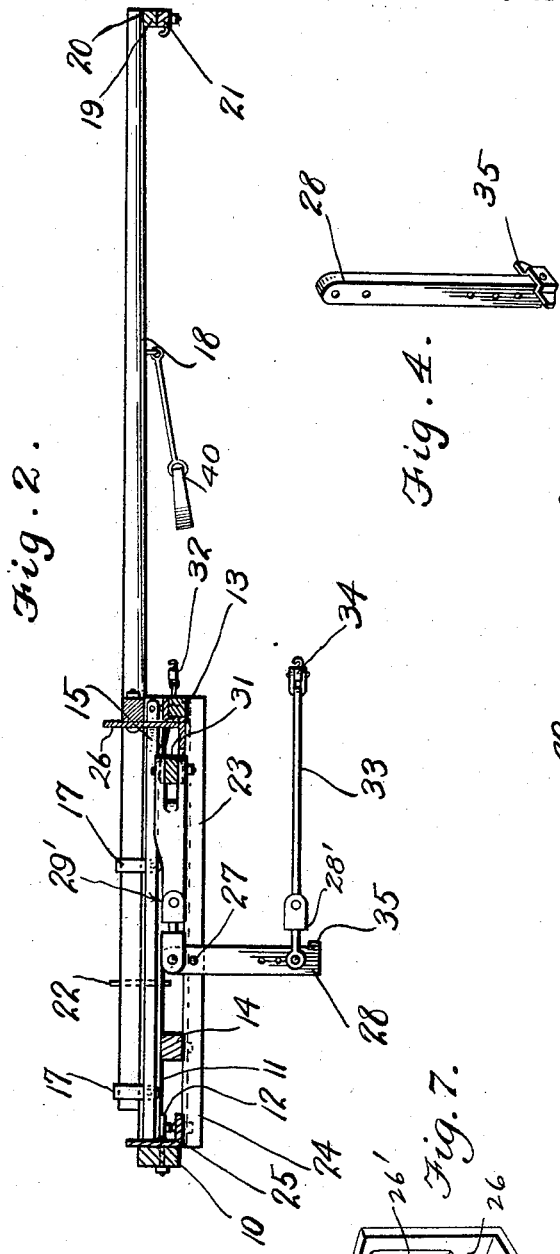
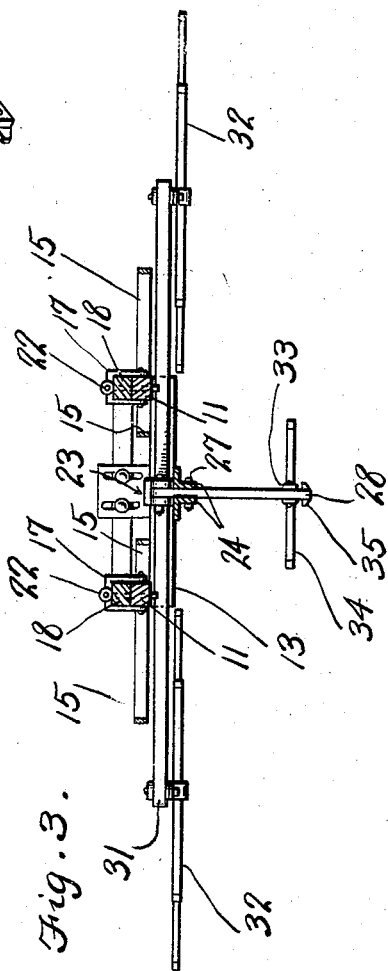
L. B. James
WITNESS:
L. E. Varing
INVENTOR
BY Victor J. Evans
ATTORNEY

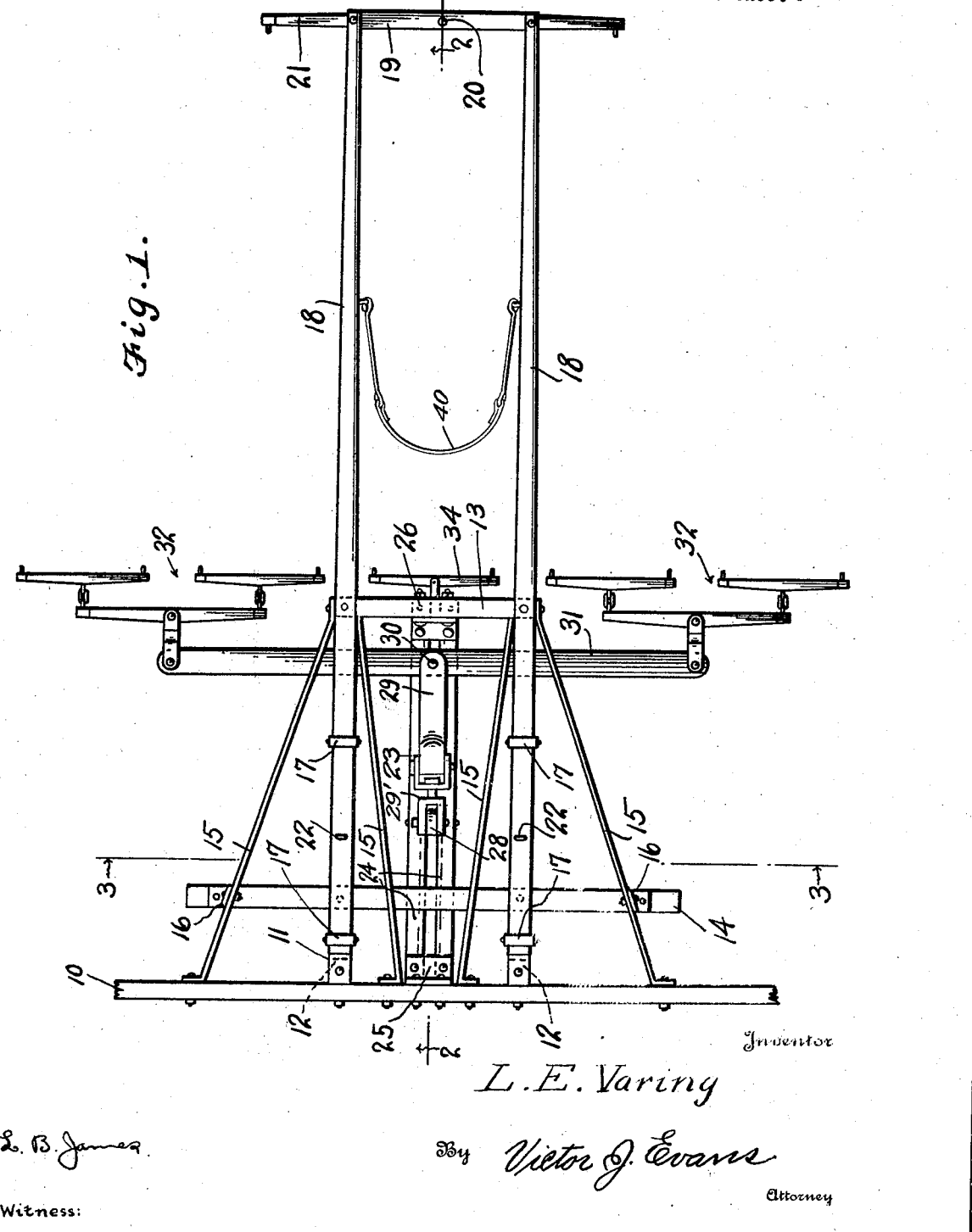

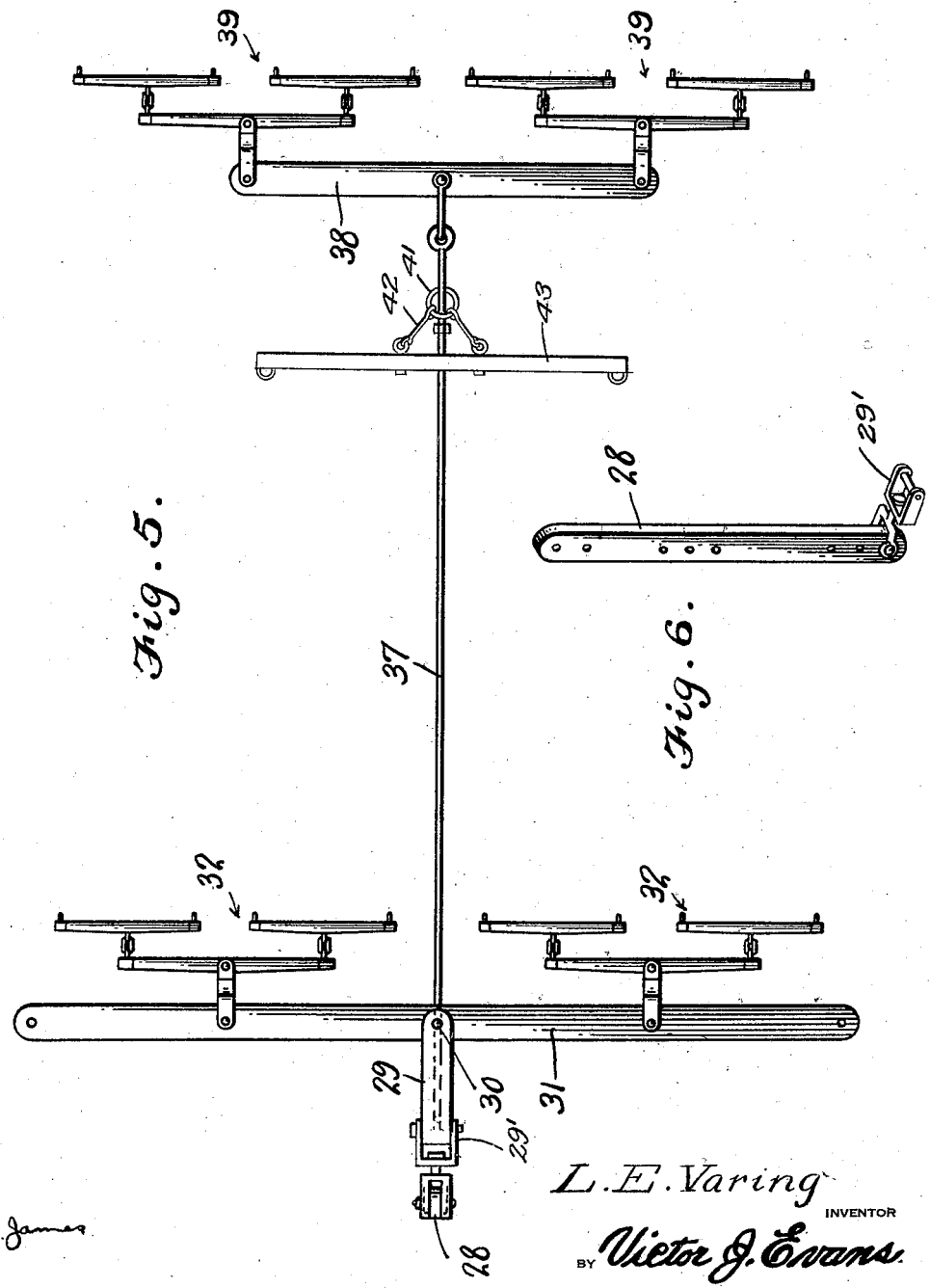

Patented Mar. 25, 1924.

1,488,415

UNITED STATES PATENT OFFICE.

LOUIS E. VARING, OF VOLIN, SOUTH DAKOTA.

DRAFT EQUALIZER.

Application filed July 31, 1922. Serial No. 578,794.

*To all whom it may concern:*

Be it known that I, LOUIS E. VARING, a citizen of the United States, residing at Volin, in the county of Yankton and State of South Dakota, have invented new and useful Improvements in Draft Equalizers, of which the following is a specification.

This invention relates to draft equalizers.

An object of the invention is the provision of a draft equalizer constructed so as to relieve the neck of the draft animal of the weight of the tongues and to eliminate the use of the usual truck.

Another object of the invention is the provision of a draft equalizer which is capable of adjustment to provide proper clearance for laying corn, when used in connection with a two row cultivator.

Another object of the invention is the provision of a draft equalizer arranged so as to prevent crowding of the draft animals and provide proper circulation of air between the animals, and to permit of adjustment to accommodate the equalizer for use with various numbers of animals.

Another object is the provision of a draft equalizer which, when used in connection with vehicles equipped with stiff tongues, will effectually prevent side draft.

With the above and other objects in view, the invention further includes the following novel features and details of construction, to be hereinafter more fully described, illustrated in the accompanying drawings and pointed out in the appended claims.

In the drawings:—

Figure 1 is a plan view of a five horse draft equalizer constructed in accordance with the invention.

Figure 2 is a section on the line 2—2 of Figure 1.

Figure 3 is a section on the line 3—3 of Figure 1.

Figure 4 is a detail perspective view of the adjustable equalizer lever.

Figure 5 is a plan view showing the equalizer arranged for eight horses.

Figure 6 is a view of the adjustable equalizer lever for use when the invention is arranged as shown in Figure 5.

Figure 7 is a detail perspective view of one of the angle plates.

Referring in detail to the drawings, wherein like characters of reference denote corresponding parts, the reference character 10 indicates a portion of the axle of a vehicle or machine (for example, a two row cultivator). This cultivator is of the type wherein the draft is applied directly to the axle and is equipped with stub tongues 11, which have their inner ends secured to the axle 10 by means of brackets 12. The outer ends of these tongues are connected by a transverse beam 13, so that a substantially rectangular frame is provided which extends forwardly from the axle 10. The frame further includes a transversely extending bar 14 and inclined braces 15, the latter having their inner ends secured to the axle 10 and their outer ends to the ends of the stub shafts 11. Certain of the braces, for example the outside braces 15 are secured to the transverse bar 14 as shown at 16.

The stub shafts 11 are provided with upwardly extending spaced yokes 17 which are adapted to receive the inner ends of removable tongues 18, the latter extending forwardly beyond the transverse beam 13 for an appreciable distance and having their outer ends connected by a spacing bar 19, to which is pivotally secured as shown at 20, a yoke bar 21. The inner ends of the tongues 18 are receivable within the spaced yokes 17 and are removably held therein by means of pins or bolts 22 which pass through the tongues 18 and the stub shafts 11.

Located centrally between and extending longitudinally of the tongues 18 is a draw bar 23, which includes spaced connecting rails 24, whose inner ends are secured to the axle 10 by means of angle plates 25, while the outer ends of the rails 24 are connected to the transverse beam 13 by an angle plate 26. This plate 26 has one of its arms secured to the adjacent ends of the spaced connecting rails 24 of the draw bar, while the other arm of this plate is provided with spaced parallel slots 26' for the passage of bolts, whereby the said plate may be adjustably connected to the transverse beam 13. This provides means for vertically adjusting the forward end of the draw bar to regulate the height of the draft. By spacing the rails 24 apart, a longitudinally extending slot is provided between said rails and pivotally mounted within this slot as shown at 27 is an equalizing lever 28. This lever extends upward above the draw bar 23 and has its upper end connected to one end of a connector block 29, by means of a swiveled clevis 29' while the outer or opposite end of this block is pivotally connected as shown at 30 to a main equalizer bar 31. This last mentioned bar has connected to its outer end double trees 32, which are positioned upon the outside of the tongues 18, while the main equalizer bar 31 is slidable between the tongues 11 and the draw bar 23. Two horses may thus be connected to each end of the equalizer bar 31 and to the yoke bar 21.

Connected to the lower end of the adjustable equalizing lever 28 by means of a swiveled clevis 28', is a link or rod 33, which carries at its outer end a single tree 34, so that a single animal may be attached to the equalizer between the tongues 18.

As thus far described, the invention provides an equalizer which is capable of use with five draft animals, one of which is positioned between the tongues 18, while two are located upon the outside tongues. As the main equalizing bar 31 is located below the tongues 18 for connection with four draft animals and the fifth draft animal connected beneath the tongues at a greater distance below the pivot 27 than the distance between that pivot and the upper end of the lever 28, an increased leverage for the single animal will be provided, so that the outer ends of the tongues 18 and their connecting bar 19 will be balanced. Any tendency of the tongues to rise will be overcome by the draft animals which are connected to the equalizer bar 31 and it is preferred to connect the double trees 32 to this equalizer bar on a plane below the bar, as shown by the dotted lines in Figure 2 of the drawings. Accurate balance of the outer ends of the tongues 18 may be obtained by adjusting the point of pivotal connection between the draw bar and the equalizing lever 28. The lower end of the equalizing lever 28 is preferably provided with a clip having oppositely and outwardly extending lugs 35 which engage and limit the downward movement of the rod or link 33 so as to prevent the latter from dragging upon the ground. The lower end of the lever 33 is provided with spaced openings so that further adjustment may be obtained by arranging the point of connection between the lever 28 and the rod or link 33.

In Figure 5 of the drawings the equalizer is shown for use in connection with eight animals. In this figure the arrangement is substantially the same as that shown in the preceding form of the invention, although only a portion of the structure is shown and the double trees 32 are connected to the main equalizer bar 31 at points spaced from the inner ends of the latter. In addition, the single tree 34 and the link 33 are dispensed with and the lower end of the adjustable equalizing lever 28 has connected thereto by means of a clevis 36, the inner end of a flexible member 37. The outer end of this member is connected to a transverse bar 38 and this last mentioned bar has connected to each end thereof double trees 39. This provides a hitch for eight animals and may be connected to an implement or machine of the character previously described, the tongues 18 being dispensed with. The adjustable equalizing bar 28 may also be connected directly to the clevis, of a machine or implement, such as a drag or other machine, but when so connected must be reversed, so that the pull upon the main equalizer bar 31 is from beneath and the pull upon the opposite end of the adjustable equalizing bar 28 from above.

In Figure 1, the breeching 40 is shown as connected to the tongues 18 and provides means whereby the center draft animal may exert a backward pressure against the equalizer.

Mounted upon the flexible member 37 by means of a ring and links 41 and 42, is a neck yoke 43 which serves to support the outer end of the flexible member 37 and the transverse bar 38 and the double trees 39.

The invention is susceptible of various changes in its form, proportions and minor details of construction and the right is herein reserved to make such changes as properly fall within the scope of the appended claims.

Having described the invention what is claimed is:—

1. The combination with a machine frame including forwardly extending tongues and spaced transverse members connecting the tongues, of a draw bar, means connecting the opposite ends of the draw bar to the transverse members centrally and below the plane of the tongues, a lever pivotally secured to the draw bar, a main equalizer bar extending transversely between the tongues and draw bar, a connection between the draw bar and lever, draft gear connected to the lever and draft gear connected to the equalizer bar.

2. The combination with a machine frame including forwardly extending spaced tongues, of a draft equalizer including spaced relatively long tongues, an equalizer bar between the tongues, a pivotally mounted lever, means connecting one end of the lever to the equalizer bar, draft gear connected to the equalizer bar, draft gear connected to the pivotally mounted lever and means for removably securing the draft equalizer tongues to the tongues of the machine frame.

In testimony whereof I affix my signature.

LOUIS E. VARING.